(12) United States Patent
Yamamura et al.

(10) Patent No.: US 6,968,934 B2
(45) Date of Patent: Nov. 29, 2005

(54) LUBRICATING STRUCTURE OF FRICTION ENGAGING DEVICE

(75) Inventors: Norihiro Yamamura, Nishikamo-gun (JP); Yuji Yasuda, Nishikamo-gun (JP); Hirofumi Onishi, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/773,172

(22) Filed: Feb. 9, 2004

(65) Prior Publication Data

US 2004/0159521 A1    Aug. 19, 2004

(30) Foreign Application Priority Data

Feb. 14, 2003   (JP) .............................. 2003-037378

(51) Int. Cl.⁷ .................... F16D 13/74; F16H 57/08
(52) U.S. Cl. ............... 192/70.12; 192/113.34; 475/159
(58) Field of Search ............. 192/70.12, 113.34, 192/113.36, 85 AA; 475/159, 160, 331; 74/467

(56) References Cited

U.S. PATENT DOCUMENTS

| | | | | |
|---|---|---|---|---|
| 4,730,514 A | * | 3/1988 | Shikata et al. ........... | 192/70.12 |
| 4,848,177 A | * | 7/1989 | Miura et al. ................. | 74/467 |
| 5,570,767 A | * | 11/1996 | Lauscher ................. | 192/70.12 |
| 5,967,929 A | * | 10/1999 | Matsuoka et al. ....... | 192/113.34 |
| 6,145,644 A | * | 11/2000 | Mohan et al. .......... | 192/113.34 |
| 6,585,095 B2 | * | 7/2003 | Savoyard et al. ........ | 192/70.12 |

FOREIGN PATENT DOCUMENTS

| | | | |
|---|---|---|---|
| JP | 2-278043 A | * | 11/1990 |
| JP | 4-69412 | | 3/1992 |
| JP | 07-019320 A | | 1/1995 |
| JP | 7-243500 | | 9/1995 |
| JP | 09-079328 A | | 3/1997 |
| JP | 10-252777 A | | 9/1998 |
| JP | 10-299875 A | | 11/1998 |
| JP | 2002-161973 | | 6/2002 |

* cited by examiner

Primary Examiner—Rodney H. Bonck
(74) Attorney, Agent, or Firm—Oblon, Spivak, McClelland, Maier & Neustadt, P.C.

(57) ABSTRACT

A lubricating structure of a friction engaging device including a rotating drum which is a cylindrical rotating body, around a perimeter of which there is provided a friction member, and which is engaged with/disengaged from a predetermined coupling member via the friction member; and a ring gear which is spline-coupled to an inner surface of the rotating drum and which is positioned while contacting an inward flange that is integrally provided with the rotating drum. In the lubricating structure, a centrifugal oil passage which is formed between the ring gear and the inward flange, and which introduces lubricating oil inside the rotating drum to a spline-coupled portion of the ring gear and the rotating drum by centrifugal force, and a plurality of through holes which are formed in the rotating drum and through which the lubricating oil, that has flowed into the spline-coupled portion, flows to an outside of the rotating drum where the friction member is provided are formed.

20 Claims, 5 Drawing Sheets

FIG. 2

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

LUBRICATING STRUCTURE OF FRICTION ENGAGING DEVICE

INCORPORATION BY REFERENCE

The disclosure of Japanese Patent Application No. 2003-037378 filed on Feb. 14, 2003 including the specification, drawings and abstract is incorporated herein by reference in its entirety.

BACKGROUND OF THE INVENTION

1. Field of the Invention

The invention relates to friction engaging devices such as a clutch and a brake. More particularly, the invention relates to a lubricating structure for lubricating a friction member.

2. Description of the Related Art

Friction engaging devices in each of which a friction member is provided around the perimeter of a cylindrical rotating drum, and the rotating drum and a predetermined coupling member are engaged with/disengaged from each other via the friction member, for example, a multi-disk clutch, a multi-disk brake, a belt brake and a one-way clutch, are widely used in a power transmission device such as an automatic transmission for a vehicle. For example, Japanese Patent Laid-Open Publication No. 04-69412 discloses a power transmission device in which a through hole is formed in a rotating drum, and lubricating oil inside the rotating drum flows outside the rotating drum through the through hole by centrifugal force so as to lubricate a friction member.

In order to make a power transmission device as compact as possible, for example, a ring gear of a planetary gear set may be spline-coupled to the inner surface of the rotating drum, and may be positioned by a snap ring or the like while the ring gear contacts an inward flange which is integrally provided with the rotating drum. However, in the case where the ring gear is provided inside the rotating drum, even when a through hole is formed in the rotating drum, the lubricating oil cannot be supplied sufficiently to the friction member provided around the perimeter of the rotating drum. Also, a through hole may be formed in the ring gear. However, in this case, there is a possibility that the strength of the ring gear will be reduced.

SUMMARY OF THE INVENTION

The invention is made in the light of the above-mentioned circumstances. It is an object of the invention to provide a lubricating structure of a friction engaging device, which can supply a sufficient amount of lubricating oil to a friction member provided around the perimeter of a rotating drum without forming a hole in a ring gear, even when the ring gear is provided inside the rotating drum.

According to an embodiment of the invention, there is provided a lubricating structure for lubricating a friction member in a friction engaging device in which the friction member is provided around the perimeter of a rotating drum, and the rotating drum and a predetermined coupling member are engaged with/disengaged from each other via the friction member, while a ring gear is spline-coupled to the inner surface of the rotating drum, and is positioned in the state where the ring gear contacts an inward flange which is integrally provided with the rotating drum. The lubricating structure includes (a) a centrifugal oil passage which is formed between the ring gear and the inward flange, and which introduces lubricating oil inside the rotating drum to a portion where the ring gear and the rotating drum are spline-coupled to each other (hereinafter, referred to as a "spline-coupled portion of the ring gear and the rotating drum" or simply as a "spline-coupled portion") by centrifugal force, and (b) a plurality of through holes which are formed in the rotating drum and through which the lubricating oil, that has flowed into the spline-coupled portion, flows to the outside of the rotating drum where the friction member is provided.

In such a lubricating structure of a friction engaging device, the centrifugal oil passage is formed between the ring gear and the inward flange, and the lubricating oil inside the rotating drum is introduced to the spline-coupled portion of the ring gear and the rotating drum by centrifugal force and flows outside the rotating drum through the through holes formed in the rotating drum. Therefore, it is possible to supply a sufficient amount of lubricating oil to the friction member provided around the perimeter of the rotating drum without forming a hole in the ring gear.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which:

FIG. 2 is a table showing engaged/disengaged states of clutches and applied/released states of brakes for achieving each shift speed of an automatic transmission in FIG. 1;

DESCRIPTION OF THE EXEMPLARY EMBODIMENTS

In the following description and the accompanying drawings, the present invention will be described in more detail with reference to exemplary embodiments.

Figure 1:
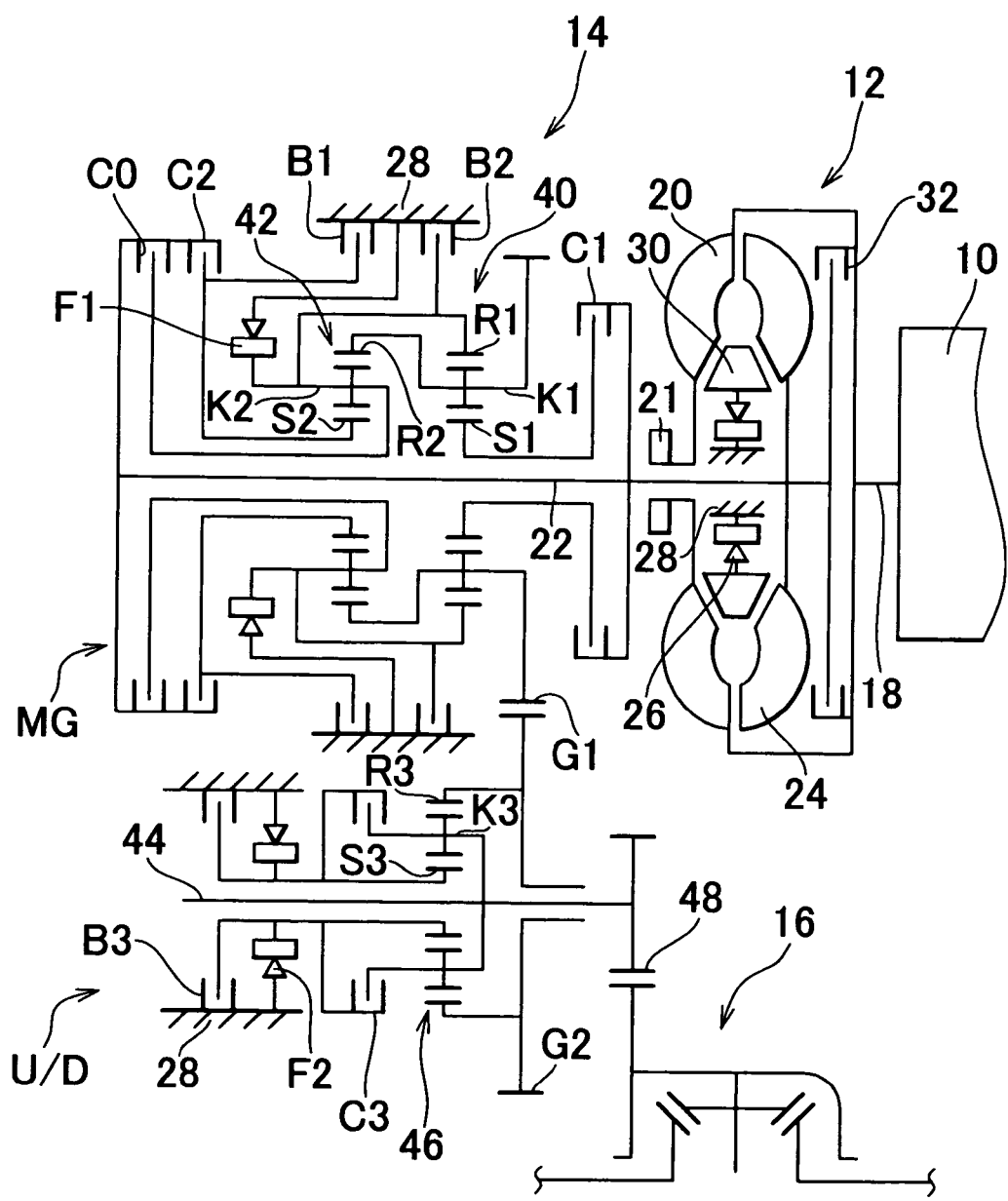
FIG. 1 is a diagram schematically showing a configuration of a drive-train unit for a vehicle, to which the invention is applied.

FIG. 1 is a view schematically showing a transverse drive-train unit for a vehicle such as a FF (front engine-front drive) vehicle. The output from an engine 10, such as a gasoline engine, which generates power due to combustion of fuel is transmitted to drive wheels (front wheels) (not shown) via a torque converter 12, an automatic transmission 14 and a differential gear unit 16. The torque converter 12 includes a pump impeller 20 which is coupled to a crank shaft 18 of the engine 10; a turbine runner 24 which is coupled to an input shaft 22 of the automatic transmission 14; a stator 30 which is fixed to a case 28, that is a non-rotating member, via a one-way clutch 26; and a lockup clutch 32 which directly connects a crank shaft 18 to the input shaft 22 via a damper (not shown). The lockup clutch 32 is a hydraulic friction engaging device which is frictionally engaged due to the difference between the fluid pressure in an engagement side oil chamber and the fluid pressure in a disengagement side oil chamber. A mechanical oil pump 21 such as a gear pump is coupled to the pump impeller 20, and is driven by the engine 10 so as to rotate together with the pump impeller 20. The hydraulic pressure for shifting and lubrication is thus generated. The engine 10 is a driving force source for running of the vehicle, the torque converter 12 is a hydrodynamic power transmission device, and the automatic transmission 14 is a power transmission device.

The automatic transmission 14 is provided with the input shaft 22, a first planetary gear set 40, a second planetary gear set 42, a third planetary gear set 46, and an output gear 48. All the first planetary gear set 40, the second planetary gear set 42 and the third planetary gear set 46 are single pinion type. The first planetary gear set 40 and the second planetary gear set 42 are provided coaxially with the input shaft 22, and form a so-called CR-CR coupled planetary gear mechanism when a carrier of the first planetary gear set 40 is coupled to a ring gear of the second planetary gear set 42, and a carrier of the second planetary gear set 42 is coupled to a ring gear of the first planetary gear set 40. The third planetary gear set 46 is provided coaxially with a counter shaft 44 which is in parallel with the input shaft 22. The output gear 48 is fixed to an end of the counter shaft 44 and is meshed with the differential gear unit 16. The elements of each of the planetary gear sets 40, 42 and 46, that is, a sun gear, the ring gear and the carrier, which rotatably supports planetary gears that are meshed with the sun gear and the ring gear, are selectively coupled to each other or coupled to the input shaft 22 by four clutches C0, C1, C2, and C3, and are selectively coupled to the case 28, which is a non-rotatable member, by three brakes B1, B2 and B3. Also, the elements of the planetary gear sets 40, 42 and 46 are coupled to each other or coupled to the case 28 depending on a rotating direction by two one-way clutches F1 and F2. It should be noted that since the differential gear unit 16 is configured so as to be symmetric with respect to an axle, the lower portion thereof is omitted in FIG. 1.

The pair of the first planetary gear set 40 and second planetary gear set 42 which is provided coaxially with the input shaft 22, together with the clutches C0, C1, C2, the brakes B1 and B2, and the one-way clutch F1 make up a primary transmitting portion MG for four forward speeds and one reverse speed. The third planetary gear set 46 which is provided coaxially with the countershaft 44, together with the clutch C3, the brake B3, and the one-way clutch F2 make up a secondary transmitting portion, i.e., an under drive portion U/D. In the primary transmitting portion MG, the input shaft 22 is coupled to i) the carrier K2 of the second planetary gear set 42 via the clutch C0, ii) a sun gear S1 of the first planetary gear set 40 via the clutch C1, and iii) a sun gear S2 of the second planetary gear set 42 via the clutch C2. A ring gear R1 of the first planetary gear set 40 is coupled to the carrier K2 of the second planetary gear set 42, and a ring gear R2 of the second planetary gear set 42 is coupled to a carrier K1 of the first planetary gear set 40. The sun gear S2 of the second planetary gear set 42 is coupled to the case 28 via the brake B1. The ring gear R1 of the first planetary gear set 40 is coupled to the case 28 via the brake B2. The one-way clutch F1 is provided between the carrier K2 of the second planetary gear set 42 and the case 28. A first counter gear G1, which is fixed to the carrier K1 of the first planetary gear set 40, is in mesh with a second counter gear G2, which is fixed to a ring gear R3 of the third planetary gear set 46, and power is transmitted between the primary transmitting portion MG and the under drive portion U/D. In the under drive portion U/D, a carrier K3 and the sun gear S3 of the third planetary gear set 46 are coupled together via the clutch C3. Also, in the under driver portion U/D, the brake B3 and the one-way clutch F2 are provided in parallel between the sun gear S3 and the case 28.

The clutches C0, C1, C2, and C3 and the brakes B1, B2, B3 are hydraulic friction engaging devices, the clutches C being, for example, multi-disc clutches and the brakes B being, for example, band brakes which are controlled by hydraulic actuators. As shown in FIG. 2, these clutches C are switched between an engaged state and a disengaged state and brakes B are switched between an applied state and a released state, and each speed, i.e., five forward speeds, one reverse speed, or a neutral speed, is achieved according to a position of a shift lever (not shown). The denotations "1st" to "5th" in FIG. 2 denote the first forward speed to the fifth forward speed, respectively. In the figure, a circle indicates an engaged/applied state, an "X" indicates a disengaged/released state, and a triangle indicates an engaged state which is not related to power transmission. In FIG. 2, a reference character "P" indicates a park position, a reference character "N" indicates a neutral position, a reference character "R" indicates a reverse position, and a reference character "D" indicates forward automatic drive positions.

Figure 3:
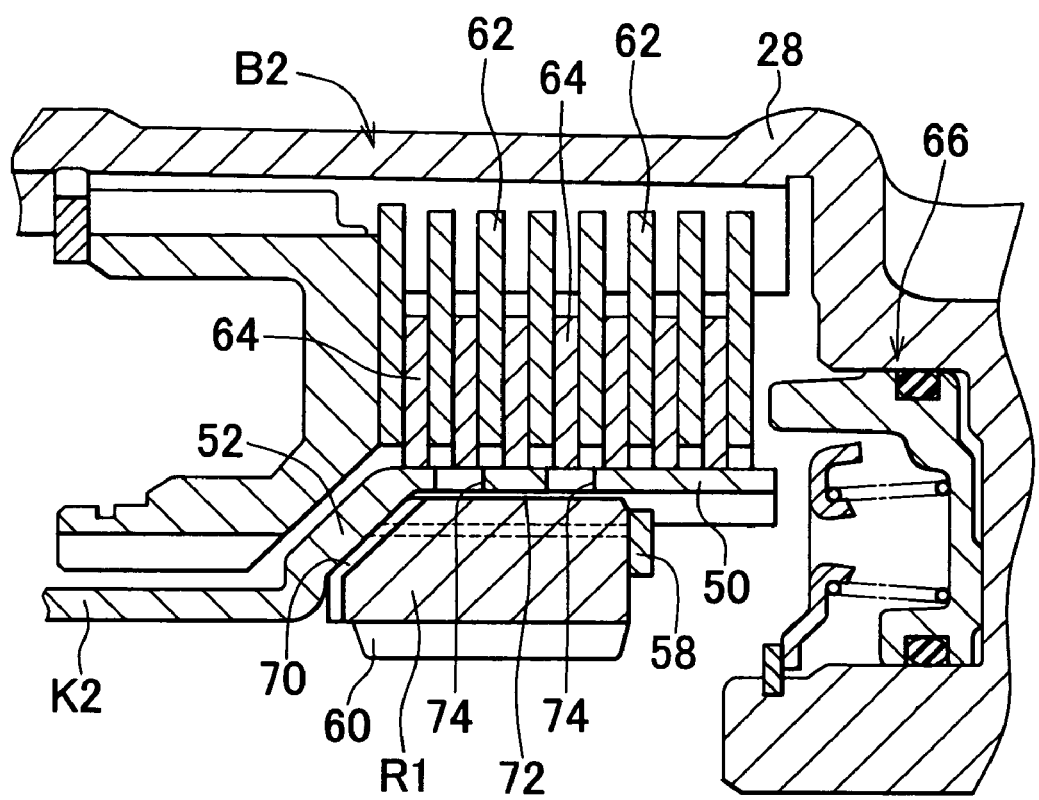
FIG. 3 is a cross sectional view concretely showing a lubricating structure of a brake B2 in the automatic transmission in FIG. 1.
Figure 4:
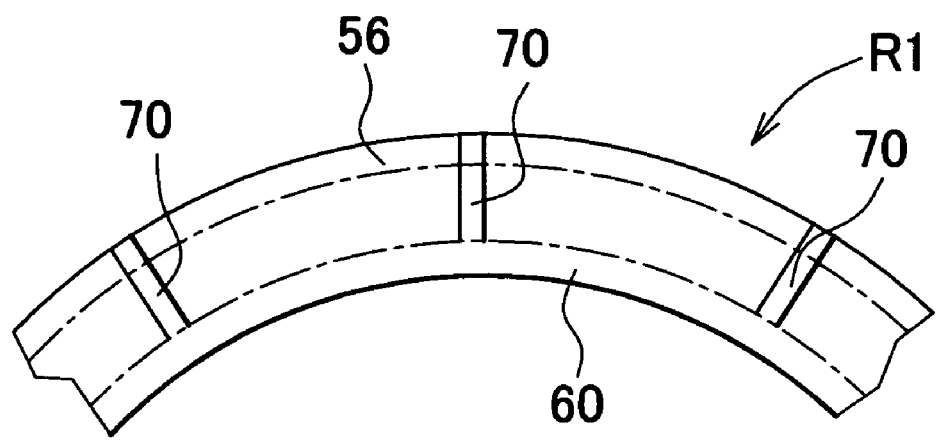
FIG. 4 is a view showing radius direction grooves formed on one end face of a ring gear R1 in FIG. 3.
Figure 5:
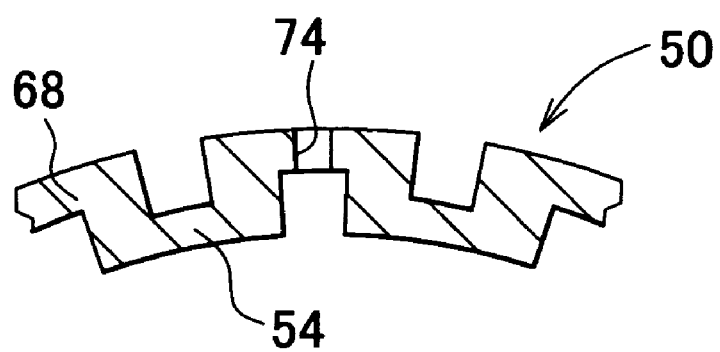
FIG. 5 is a cross sectional view of a rotating drum in FIG. 3 in a peripheral direction.

FIG. 3 shows a lubricating structure of a brake R2 which couples the ring gear R1 of the first planetary gear set 40 and the carrier K2 of the second planetary gear set 42 to the case 28 such that the ring gear R1 and the carrier K2 cannot rotate. FIG. 3 is a cross sectional view of an upper portion of the lubricating structure cut in the longitudinal direction. A cylindrical rotating drum 50, which functions as a rotating member on the inner side of the brake B2, is integrally provided with the carrier K2 through a taper portion 52. The rotating drum 50 is formed, for example, by bending or drawing by press. As shown in FIG. 5, the cross section of the rotating drum 50 in the peripheral direction is in a wave shape, that is, the distance from the shaft center to the inner surface of the rotating drum 50 changes at regular intervals. The convexoconcave on the inner surface is used as a spline 54 which is spline-coupled to the ring gear R1 such that relative rotation between the ring gear R1 and the rotating drum 50 cannot be performed. On the outer surface of the ring gear R1, a spline 56 (refer to FIG. 4) is provided so as to correspond to the spline 54. The taper portion 52 corresponds to an inward flange which extends inwardly from an end portion of the rotating drum 50. The ring gear R1 contacts the taper portion 52 in the axial direction, and is fixed by a snap ring 58 attached to the rotating drum 50 so as to be prevented from sliding out of place. The ring gear R1 is an internal gear. A plurality of gear teeth 60 are provided on the inner surface of the ring gear R1, and are meshed with pinion gears of the first planetary gear set 40.

The brake B2 includes a plurality of inward frictional plates 62 which are spline-coupled to the inner surface of the case 28 such that relative rotation between the case 28 and the inward frictional plates 62 cannot be performed; and a plurality of outward frictional plates 64 each of which is interposed between the internal frictional plates 62 and which are spline-coupled to the outer surface of the rotating drum 50 such that relative rotation between the outward frictional plates 64 and the rotating drum 50 cannot be performed. By frictionally engaging the inward frictional plates 62 and the outward frictional plates 64 using a hydraulic cylinder 66 provided in the case 28, the rotating drum 50, the ring gear R1, and the carrier K2 are integrally coupled to the case 28. The convexoconcave on the outer surface of the rotating drum 50 is used as a spline 68 which is spline-coupled to the outward frictional plates 64. The case 28 corresponds to a coupling member, and each of the inward frictional plates 62 and the outward frictional plates 64 corresponds to a friction member.

Plural straight radius direction grooves 70 which extend in the radius direction are formed in a radial pattern on one end surface of the ring gear R1, which contacts the taper portion 52. The lubricating oil inside the rotating drum is introduced to the coupled portion of the spline 54 and the spline 56 through the radius direction grooves 70 by centrifugal force. The lubricating oil is discharged, for example, from the input shaft 22, and a pinion shaft of the first planetary gear set 40, lubricates the gear teeth 60 of the ring gear R1, and then flows toward the outer side by centrifugal force so as to flow into the radius direction grooves 70. A plurality of the radius direction grooves 70 correspond to a centrifugal oil passage. Each of the radius direction grooves 70 is formed, for example, in a portion where there is a spline tooh of the spline 56.

In the coupled portion of the spline 54 and the spline 56, a predetermined clearance 72 between teeth (hereinafter, referred to as a "between-teeth clearance 72") is formed in the radius direction and the peripheral direction on the entire periphery. The lubricating oil, which has flowed into the coupled portion, flows in the axial direction (rightward, in FIG. 3) through the between-teeth clearance 72. In the rotating drum 50, a through hole 74 is formed at a portion which is convex outwardly and which is positioned at the outer surface of the ring gear R1, and the lubricating oil supplied through the between-teeth clearances 72 flows to the outside of the rotating drum, where the frictional plates 62 and 64 are provided. In the embodiment, the through hole 74 is formed in plurality at the same regular angle intervals as the radius direction grooves 70 in the peripheral direction, and the ring gear R1 is spline-coupled to the rotating drum 50 at a rotational phase where the radius direction grooves 70 match the through holes 74. However, the angle intervals and the phases of the radius direction grooves 70 and the through holes 74 may be deviated from each other. The size of the between-teeth clearance 72, that is, the radius of each of the splines 54 and 56, the number of each of the radius direction grooves 70 and the through holes 74, and the cross sectional area of each of the radius direction groove 70 and the through hole 74 are decided such that the lubricating oil whose amount is required for lubricating the frictional plates 62 and 64 flows out from the through holes 74 and is supplied to the frictional plates 62 and 64.

In such a lubricating structure of the brake 2, a plurality of the radius direction grooves 70 are formed on one end surface of the ring gear R1, the lubricating oil inside the rotating drum is introduced to the coupled portion of the splines 54 and 56 through the radius direction grooves 70 by centrifugal force, flows in the axial direction through the between-teeth clearance 72 between the splines 54 and 56, and flows outside through a plurality of the through holes 74 formed in the rotating drum. Therefore, it is possible to supply a sufficient amount of lubricating oil to the frictional plates 62 and 64 provided around the perimeter of the rotating drum 50 without forming a hole in the ring gear R1.

Figure 6:
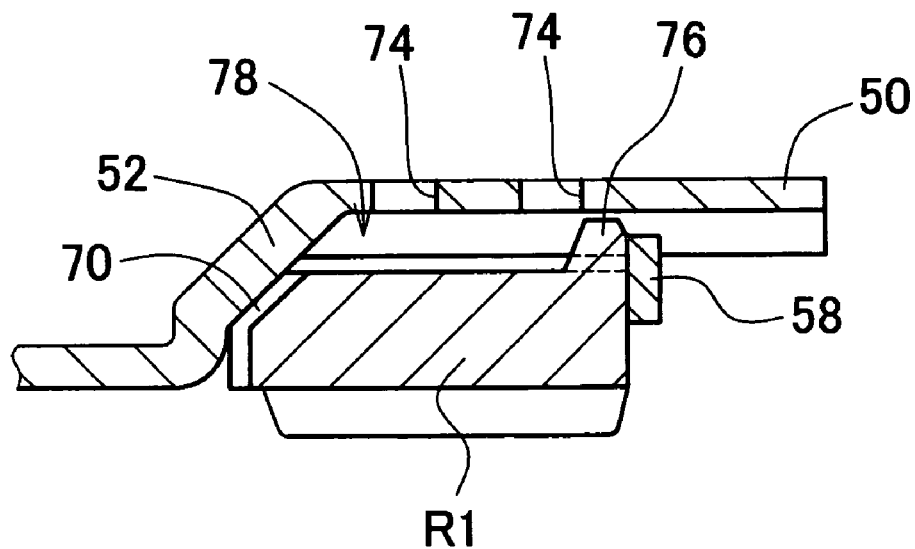
FIG. 6 is a view showing another example of the lubricating structure in FIG. 3, and is a cross sectional view of a spline-coupled portion of the ring gear R1 and the rotating drum.

In the above-mentioned embodiment, the lubricating oil flows in the axial direction through the between-teeth clearance 72 between the splines 54 and 56. However, as shown in FIG. 6, among the spline 56 of the ring gear R1, the spline tooth 76 of a portion which corresponds to the radius direction groove 70 may be removed by machining such that the between-teeth clearance 72 of this portion is made larger than that of the other portion, and the portion where the spline tooth 76 is removed may be used as an axial direction oil passage 78. The entire spline tooth 76 can be removed by machining. However, in the embodiment, the portion of the spline tooth 76 that extends over to the far edge of the through hole 74, this portion including the portion corresponding to the through hole 74, is removed so that it does not interfere with the flow of the lubricating oil through the through hole 74. Accordingly, the spline tooth 76 remains extending in the axial direction from the far edge of the through hole 74.

In this case, the lubricating oil which has been introduced to the coupled portion of the splines 54 and 56 flows efficiently to the through hole 74 side through the axial direction oil passage 78, the axial direction oil passage 78 is formed in a portion that extends over to the far edge of the through hole 74, this portion including the portion corresponding to the through hole 74, and the spline tooth 76 remains extending from the far edge of the though hole 74. Therefore, the lubricating oil temporarily stops in the axial direction at the portion corresponding to the through hole 74, and flows outside the rotating drum through the through hole 74, and is supplied to the frictional plates 62 and 64 efficiently.

Also, since part of the spline tooth 76 remains, an increase in the pressure of the splines 54 and 56 can be suppressed during torque transmission, and the cost for after-processing due to removal of the spline tooth can be reduced, compared with the case where the spline tooth is removed entirely in the axial direction.

Figure 7:
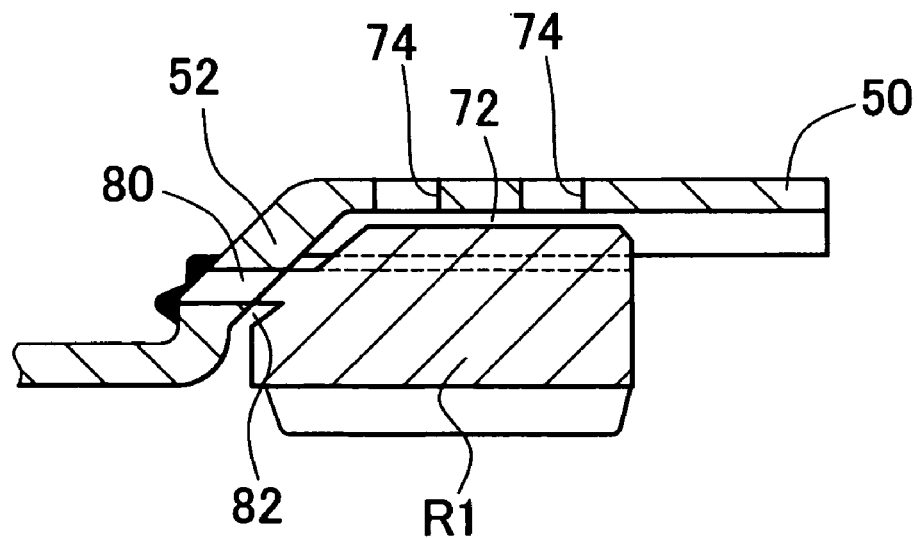
FIG. 7 is a view showing yet another example of the lubricating structure in FIG. 3, and is a cross sectional view of a spline-coupled portion of the ring gear R1 and the rotating drum.

An embodiment in FIG. 7 shows a case where plural protrusions 80 are formed at predetermined intervals in the peripheral direction on one end surface of the ring gear R1, that is, the end surface which faces the taper portion 52, and the ring gear R1 is fixed integrally to the taper portion 52 through the protrusions by welding such that a predetermined clearance 82 is formed between the ring gear R1 and the taper portion 52. In this case, the clearance 82 is used as a centrifugal oil passage, and the effects which are same as those of the first embodiment can be obtained. When the ring gear R1 is fixed by welding, the snap ring 58 for positioning the ring gear R1 is not required.

The invention is preferably applied to a lubricating structure of a frictional clutch, brake and the like of a power transmission device such as an automatic transmission for a vehicle. However, the invention can be applied to a lubricating structure of a friction engaging device used for a power transmission device and the like for systems other than a vehicle.

In the embodiment, the friction engaging device is a multi-disk friction engaging device in which a cylindrical coupling member is provided coaxially with the rotating drum and around the perimeter of the rotating drum such that relative rotation between the rotating drum and the coupling member can be performed, a plurality of inward frictional plates are provided inside the coupling member such that relative rotation between the inward frictional plates and the coupling member cannot be performed, and a plurality of outward frictional plates are provided outside the rotating drum such that relative rotation between the outward frictional plates and the rotating drum cannot be performed. In this friction engaging device, since the inward frictional plates and the outward frictional plates are positioned alternately and are pressed by the hydraulic cylinder or the like, the rotating drum and the coupling member are coupled to each other (the rotating drum and the coupling member may be in the slip state). However, various types of friction members may be employed, for example, a single plate friction engaging device may be employed. The coupling member may be a member for fixing a position, such as a case. Also, the friction member may be a rotating member which is rotatably provided.

As mentioned above, the ring gear which is spline-coupled to the inner surface of the rotating drum is, for example, a ring gear of a planetary gear set. The lubricating oil is discharged, for example, from a shaft member provided at a center portion and a pinion shaft of the planetary gear set, lubricates gear teeth of the ring gear which is spline-coupled to the inner surface of the rotating drum, and then flows outward by centrifugal force so as to be introduced in the centrifugal oil passage.

The centrifugal oil passage is formed, for example, of radius direction grooves extending in a radial pattern. However, a clearance may be formed between the ring gear and the rotating drum by forming a plurality of protrusions on the end surface of the ring gear or on the inward flange, and the clearance may be used as the centrifugal oil passage. When the protrusions are fixed by welding, the snap ring for positioning the ring gear is not required.

The radius direction grooves extending in a radial pattern may be formed on one of the ring gear and the inward flange. However, the radius direction grooves may be formed on both of the ring gear and the inward flange. The radius direction grooves are formed, for example, so as to be straight in the direction of the normal line. The radius direction grooves need to include a radial direction element. Therefore, the radius direction grooves may be realized in various forms. For example, the radius direction grooves may be inclined in the peripheral direction, or may be formed into a scroll pattern.

The axial direction oil passage (between-teeth clearance) is formed, for example, by removing the spline tooth. However, the axial direction oil passage may be formed by increasing the depth of the spline groove. The spline tooth may be removed completely. However, the height of the spline tooth may be reduced. The amount of the lubricating oil can be adjusted by appropriately setting the height of the spline tooth or the depth of the spline groove. Either the spline of the rotating drum or the spline of the ring gear may be deformed. However, both of them may be deformed.

As mentioned above, the axial direction oil passage is formed so as to correspond to the radius direction groove as the centrifugal oil passage. However, the invention is not limited to this. For example, the lubricating oil may flow from the between-teeth clearance, which is originally formed on the entire periphery of the spline-coupled portion of the rotating drum and the ring gear, to the through hole. Also, it is possible to actively increase the between-teeth clearance and to adjust the amount of the lubricating oil which flows through the between-teeth clearance by decreasing the height of the spline teeth or by increasing the depth of the spline grooves on the entire periphery of the spline-coupled portion.

Further, the between-teeth clearance can be partially increased by after-processing such as machining. When the spline is formed by rolling processing or the like, by partially deforming the mold surface of the rolling tool or the like in advance, it is possible to partially form a large between-teeth clearance from the beginning of the rolling process. The between-teeth clearance needs to be partially increased so as to form the axial direction oil passage.

The axial direction oil passage is formed, for example, when the portion of the spline tooth that extends over to the far edge of the through hole, this portion including the portion corresponding to the through hole, is removed, and the spline tooth remains extending in the axial direction from the far edge of the through hole, or the axial direction oil passage may be formed by partially increasing the depth of the spline groove of the rotating drum in the axial direction. Furthermore, various forms can be employed as described below. For example, the axial direction oil passage is formed when the height of the portion of at least one spline tooth that extends over to the far edge of the through hole, this portion including the portion corresponding to the through hole, is reduced, or when the depth of the portion of at least one spline groove that extends over to the far edge of the through hole, this portion including the portion corresponding to the through hole, is increased.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A friction engaging device, comprising:
   a rotating drum which is a cylindrical rotating body, around a perimeter of which there is provided a friction member, and which is engaged with/disengaged from a predetermined coupling member via the friction member; and
   a ring gear which is spline-coupled to an inner surface of the rotating drum and which contacts an inward flange that is integrally provided with the rotating drum, wherein
   a centrifugal oil passage which is formed between the ring gear and the inward flange, and which introduces lubricating oil inside the rotating drum to a spline-coupled portion of the ring gear and the rotating drum by centrifugal force, and a plurality of through holes which are formed in the rotating drum and through which the lubricating oil, that has flowed into the spline-coupled portion, flows to an outside of the rotating drum where the friction member is provided.

2. The friction engaging device according to claim 1, wherein the centrifugal oil passage comprises a plurality of radius direction grooves formed in a radial pattern on an end face of the ring gear or the inward flange, and an axial direction oil passage which introduces the lubricating oil in the axial direction to the through holes.

3. The friction engaging device according to claim 2, wherein the axial direction oil passage is formed by removing at least one spline tooth of the ring gear.

4. The friction engaging device according to claim 2, wherein the axial direction oil passage is formed by reducing a height of at least one spline tooth of the ring gear.

5. The friction engaging device according to claim 2, wherein the axial direction oil passage is formed by increasing a depth of at least one spline groove of the rotating drum.

6. The friction engaging device according to claim 2, wherein the axial direction oil passage is formed in a first portion of the spline-coupled portion that extends over to a far edge of one of the plurality of through holes, this first portion including a portion corresponding to the one of the plurality of through holes, and wherein a second portion of the spline-coupled portion extends from the far edge of the one of the plurality of through holes, and wherein the second portion includes a between-teeth clearance that is smaller than a between-teeth clearance in the first portion.

7. The friction engaging device according to claim 6, wherein the axial direction oil passage is formed by removing a portion of at least one spline tooth of the ring gear, that extends over to the far edge of the through hole, this portion including the portion corresponding to the through hole.

8. The friction engaging device according to claim 6, wherein the axial direction oil passage is formed by reducing a height of a portion of at least one spline tooth of the ring gear, that extends over to the far edge of the through hole, this portion including the portion corresponding to the through hole.

9. The friction engaging device according to claim 6, wherein the axial direction oil passage is formed by increasing a depth of a portion of at least one spline groove of the ring gear, that extends over to the far edge of the through hole, this portion including the portion corresponding to the through hole.

10. The friction engaging device of claim 2, wherein the axial direction oil passage is at least partially formed as a clearance between spline teeth in a first portion of the spline-coupled portion.

11. The friction engaging device of claim 10, wherein the clearance in the first portion is larger than a clearance between spline teeth in a second portion of the spline-coupled portion.

12. The friction engaging device of claim 11, wherein the first portion is closer to the radius direction grooves than the second portion.

13. The friction engaging device according to claim 2, wherein the spline-coupled portion includes a first portion and a second portion, and wherein a clearance in the first portion is larger than a clearance in the second portion such that the axial direction oil passage extends along said first portion, and wherein the plurality of through holes are located in the rotating drum at positions corresponding to the first portion of the spline-coupled portion.

14. The friction engaging device of claim 2, wherein the plurality of radius direction grooves are provided on an end face of the ring gear.

15. The friction engaging device of claim 2, wherein the plurality of radius direction grooves are provided on both the end face of the ring gear and the inward flange.

16. The friction engaging device according to claim 1, wherein a plurality of protrusions are formed on at least one of an end face of the ring gear or the inward flange, and a clearance is formed between the end face of the ring gear and the inward flange to form at least a portion of the centrifugal oil passage.

17. The friction engaging device according to claim 16, wherein the ring gear and the inward flange are fixed to each other using the plurality of the protrusions.

18. The friction engaging device of claim 16, wherein the plurality of protrusions are provided on an end face of the ring gear.

19. The friction engaging device of claim 16, wherein the plurality of protrusions are provided on the inward flange.

20. The friction engaging device according to claim 1, wherein a plurality of the radius direction grooves are formed on at least one of the ring gear and the inward flange to form at least a portion of the centrifugal oil passage.

* * * * *